July 10, 1962
A. ARMEN ET AL
3,043,812
DYE--RECEPTIVE COPOLYMERS
Filed Aug. 16, 1957
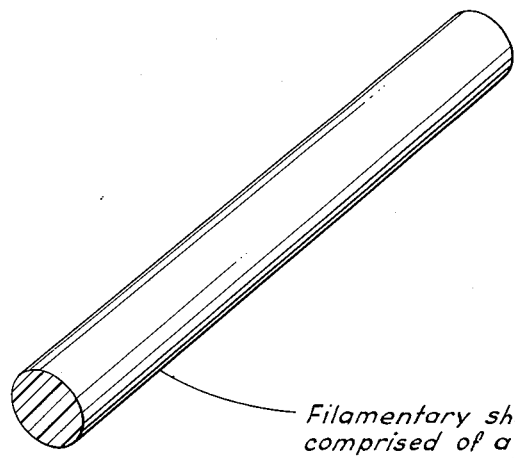
Filamentary shaped article comprised of a dye-receptive copolymer containing in its molecule recurring sulfoalkyl or sulfoaryl acrylamide groups
INVENTORS
Ardy Armen
Teddy G. Traylor
BY Griswold & Burdick
ATTORNEYS 3,043,812
DYE-RECEPTIVE COPOLYMERS
Ardy Armen and Teddy G. Traylor, Concord, Calif., assignors to The Dow Chemical Company, Midland, Mich., a corporation of Delaware
Filed Aug. 16, 1957, Ser. No. 678,498
12 Claims. (Cl. 260—79.3)

This invention lies in the general field of organic chemistry and contributes especially to the polymer art. More specifically, the present invention has reference to essentially linear, dye-receptive copolymers and shaped articles comprised thereof, particularly fibers and related filamentous structures, which copolymers contain in their molecules recurring sulfoalkyl or sulfoaryl acrylamide, or both, units or groups.

It is the object of the invention to provide new and useful copolymers and shaped articles thereof having the general chemical structure:

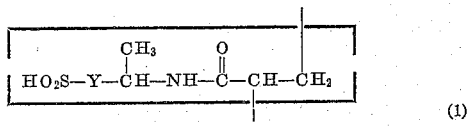

(1)

wherein Y is any bivalent bridging radical that contains from 1 to 12 carbon atoms.

The copolymers of the present invention may be considered to be derived from monomeric fragments or components of the general structure:

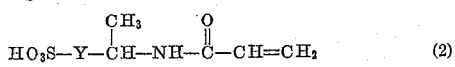

(2)

wherein Y is as above defined. In some cases it may be an advantage for Y to be a bivalent aromatic group, such as one that has been derived from a benzene or alkyl-substituted benzene nucleus or unit. As is apparent, it is also suitable and may likewise be beneficial for Y to be an alkylene radical or polymethylene group. Thus, the monomers that in effect are polymerized in the present copolymers may be typified by such exemplary compounds as N-1-sulfo-2-propyl acrylamide, N-p-sulfo-α-methylbenzyl acrylamide, N-p-sulfomethyl-α-methylbenzyl acrylamide and the like.

Beneficially, the copolymers of the present invention contain in their molecules up to about 20 percent by weight, based on the weight of the polymer, of a characteristic recurring unit according to that which is delineated in Formula 1 above. It may frequently be of greater benefit for the copolymer to contain between about 1 and 7 percent by weight of such a characteristic unit. The balance of the molecular composition of the copolymers of the present invention may be selected from the group of polymerized monomers consisting of polymerized acrylonitrile units or polymerized units of any other monoethylenically unsaturated monomers that are copolymerizable with acrylonitrile and which are free from cyano and carboxyl groups, and polymerizable mixtures of such monomers. In many cases it may be most desirable and of utmost advantage for the balance of the molecular constitution of the copolymers to consist entirely, or substantially entirely, of polymerized acrylonitrile units. However, as has been indicated, other polymerized units may also be suitably employed such as those that have been derived from such monomers as styrene and equivalent alkenyl aromatic monomers; N-vinyl pyrrolidone and equivalent vinyl lactam monomers including N-vinyl caprolactam; methyl acrylate and methyl methacrylate; vinyl acetate; acrylic acid; acrylamide and the like or their equivalents.

The copolymers of the present invention have excellent dyeability, especially with basic, acetate and vat types of dyestuffs, due to the presence of the attached sulfonic acid monomer. The dyed copolymers, especially when they are in the form of shaped articles such as fiber products, have remarkable washfastness and colorfast properties. When the copolymers of the present invention contain polymerized acrylonitrile units in the balance of their molecular constitution, especially when all or essentially all of such balance is the indicated variety of component, the copolymers are quite capable of providing excellent fiber and related filamentous products which have substantially the same characteristics and properties that are obtainable with various acrylonitrile polymers, particularly polyacrylonitrile. In this connection, it is advantageous for the copolymers of the present invention to be high polymers having a molecular weight in the same fiber-forming range (say, roughly from 25 to 60 thousand, be the same more or less) that is generally contemplated by those skilled in the art as being most desirable for acrylonitrile polymers. Of course, lower molecular weight copolymers, such as those in the range from about 5 to 15 thousand may also be obtained and may frequently be utilized with great benefit, as in coating compositions.

One convenient and satisfactory method for preparing the copolymers of the present invention is in accordance with the method that has been described by Teddy G. Traylor and Ardy Armen in their copending application for United States Letters Patent having Serial No. 667,026 which was filed on June 20, 1957 for "Improving the Dyeability of Acrylonitrile Polymers." According to the technique therein described, the copolymer products may be obtained by impregnating or subjecting an acrylonitrile polymer to intimate physical contact while it is in a polar (preferably aqueous) medium with an ethylenically unsaturated sulfonic acid monomer or compound of the general formula:

   (3)

wherein Y has the above-described values, and advantageously, subsequently heating the monomer in contact with the polymer until at least a portion of it attaches chemically to the polymer chain. When such method of preparation of the copolymers is employed, the amount of the characteristic recurring group according to Formula 1 that is obtained in the finally obtained product is dependent upon the percentage of polymerized acrylonitrile units that are present in the starting polymer being modified. Thus, in such cases, the starting polymer must contain a percentage by weight of polymerized acrylonitrile units that is equivalent to the percentage of the characteristic recurring unit desired to be present in the product.

The foregoing described technique for the preparation of the copolymers of the present invention may be practiced with the starting acrylonitrile copolymer in any fabricated or unfabricated form while it is in either a dried, swollen, or hydrated condition. Advantageously, it may be accomplished while the starting acrylonitrile polymer, such as polyacrylonitrile, is in a hydrated, water-containing, aquagel condition, particularly when the polymer in such form has been fabricated into a filamentary structure prior to its being irreversibly converted to a dry, hydrophobic polymer substance. As is well known, aquagel acrylonitrile polymer structures can be obtained readily by extruding coagulable fiber-forming solutions of the acrylonitrile polymer in solvent, aqueous saline solutions (such as 60 percent aqueous zinc chloride solutions) in suitable aqueous coagulating baths therefor (such as more dilute aqueous solutions of the same saline constituent).

It is frequently desirable to provide the copolymers of the present invention in the above-described manner since it possibilitates the ready achievement of shaped articles having about the same physical properties and characteristics as the starting shaped articles from which the present copolymers are derived. When such method of providing the copolymers is practiced, the shaped article of the starting acrylonitrile polymer may actually be a highly oriented fiber or the like filamentous article, such as that which is schematically and fancifully depicted in the sole FIGURE of the hereto annexed drawing. If desired, however, the copolymers of the present invention may be prepared in the above-indicated manner on unfabricated polymers and the copolymer products subsequently fabricated into any desired form.

The following examples further illustrate the invention.

*Example "A"*

A sample of a wet-stretched, salt-spun, polyacrylonitrile fiber in aquagel form (containing about two parts by weight of water to each part by weight of polymer in the treated structure) was immersed at room temperature for 30 minutes in a 0.35 N aqueous solution of para-vinyl benzene sulfonic acid. The fiber was then squeezed free of liquid, retaining about 7 percent by weight of the monomer, based on the weight of the acrylonitrile polymer, impregnated therein. The impregnated fiber was dried at 80° C., then heat set at 150° C. for 5 minutes. Upon infrared analysis of the thereby obtained copolymer product, it was found to contain about 7.5 percent of copolymerized N-p-sulfo-2-methylbenzyl acrylamide in its molecular structure in combination with the polymerized acrylonitrile units.

The finally finished copolymeric fiber, had a tenacity of about 3.5 grams per denier and an elongation of about 28 percent. Its molecular weight (as viscometrically determined) was about 38 thousand and its softening point was in the neighborhood of 240° C. It was found to be dyeable to very deep, level shades of coloration with Sevron Brilliant Red 4G (formerly known as Basic Red 4G) and Basic Yellow OL when dyed in a conventional manner with 2 percent dyeings (on the weight of the fiber) of each of the basic type dyestuffs. Severe scouring of the fiber in an aqueous solution of a nonionic surfactant prior to dyeing did not at all diminish its excellent dye-receptivity.

A similar copolymer product was also obtained when the foregoing treatment on the starting acrylonitrile polymer was repeated, excepting to dry the fiber completely at a temperature of 150° C. for 15 minutes. The thereby resulting copolymeric fiber products were also found to be excellently dyeable with such acetate dyestuffs as Amacel Scarlet BS and the like and such vat types of dyestuffs as Sulfanthrene Red and the like when applied in a conventional manner.

*Example "B"*

About 5 grams (on a dry weight basis) of a wet-stretched polyacrylonitrile fiber in aquagel form similar to that employed in the first example was treated in the same manner as in the first example with the execptions that a 2.94 percent by weight aqueous solution of 2-propene sulfonic acid was employed as the treating monomer and the subsequent heat setting was performed for 15 minutes at a 150° C. temperature. The resulting copolymer product was found to contain about 4 percent by weight of N-1-sulfo-2-propyl acrylamide units polymerized therein. Its molecular weight was about 40 thousand. The physical properties of the fiber product were commensurate with those of the untreated polyacrylonitrile fiber. Specifically, its tensile strength was about 3.5 grams per denier and its elongation was about 35 percent. The copolymer fiber was found to be readily dyeable to good shades of deep and level coloration with Sevron Brilliant Red 4G and to exhibit good washfastness upon scouring.

*Example "C"*

The procedure of Example "B" was repeated excepting to impregnate the fiber with about a 2.46 percent by weight aqueous solution of vinyl benzyl sulfonic acid instead of 2-propene sulfonic acid. The copolymer product was found by infrared analysis to contain about 5 percent by weight of copolymerized N-p-sulfomethyl-α-methylbenzyl acrylamide units in its molecular structure. Its molecular weight was about 40 thousand and its softening point about 235° C. The properties of the finished fiber product of the copolymer were about commensurate with those in the foregoing examples. It was found to be excellently dyeable to deep, level shades of red with Servon Brilliant Red 4G and to exhibit very good washfast characteristics.

Results equivalent to the above may be obtained when the foregoing procedure is repeated to prepare copolymer products in accordance with the present invention excepting to derive them from other acrylonitrile polymers, such as copolymers of acrylonitrile with such other monomers as styrene, methyl acrylate and methyl methacrylate which contain an amount of the polymerized acrylonitrile that is at least up to about 20 percent by weight and equivalent to the proportion of the characteristic recurring unit of the present copolymers that is desired to be obtained in the product.

What is claimed is:

1. Polymeric composition consisting essentially of inter-reacted units of: (A) between about 1 and about 20 weight percent, based on composition weight of at least one inter-reacted unit of the structure:

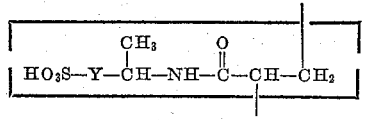

(I)

wherein Y is a bivalent bridging radical that contains from 1 to 12 carbon atoms and is selected from the group consisting of bivalent aromatic radicals and alkylene radicals; and (B) between about 99 and about 80 weight percent, based on composition weight, of recurring units of polymerized acrylonitrile.

2. The polymeric composition of claim 1, containing a recurring plurality of inter-reacted units of said structure (I).

3. A fiber-forming polymeric composition according to claim 1.

4. Polymeric composition consisting essentially of inter-reacted units of: (A) between about 1 and about 20 weight percent, based on inter-reacted weight, of recurring inter-reacted units of the individual structure:

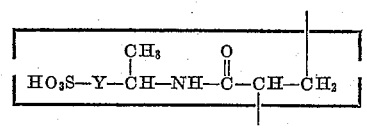

(I)

wherein Y is a bivalent bridging radical that contains from 1 to 12 carbon atoms and is selected from the group consisting of bivalent aromatic radicals and alkylene radicals; and (B) between about 99 and about 80 weight percent, based on composition weight, of recurring polymerized units selected from the group consisting of (1) polymerized acrylonitrile, (2) polymerized monoethylenically unsaturated monomers that are free from cyano and carbonyl substituents, which monomers are copolymerizable with acrylonitrile, and (3) inter-reacted mixtures of (1) and (2).

5. A fiber-forming polymeric composition according to claim 4.

6. The polymeric composition of claim 1 containing between about 1 and 7 percent by weight of said inner-reacted unit of the structure (I).

7. The polymeric composition of claim 1, wherein said inner-reacted unit of the structure (I) is a polymerized N-p-sulfo-α-methylbenzyl acrylamide unit.

8. The polymeric composition of claim 1, wherein said inner-reacted unit of the structure (I) is a polymerized N-1-sulfo-2-propylacrylamide unit.

9. The polymeric composition of claim 1, wherein said inner-reacted unit of the structure (I) is a polymerized N-p-sulfomethyl-$\alpha$-methylbenzyl acrylamide unit.

10. A polymeric composition according to claim 1, having a molecular weight between about 25 and 60 thousand.

11. A filamentary shaped article consisting essentially of the polymeric composition of claim 4.

12. A filamentary shaped article consisting essentially of the polymeric composition of claim 1.

References Cited in the file of this patent
UNITED STATES PATENTS

| | | |
|---|---|---|
| 2,527,300 | Dudley | Oct. 24, 1950 |
| 2,531,469 | Reynolds | Nov. 28, 1950 |
| 2,566,162 | Caldwell | Aug. 28, 1951 |
| 2,837,500 | Andres et al. | June 3, 1958 |
| 2,837,501 | Millhiser | June 3, 1958 |